Patented Oct. 2, 1951

2,569,884

UNITED STATES PATENT OFFICE 2,569,884

EMULSION POLYMERIZATION OF UNSATURATED ORGANIC COMPOUNDS

Arthur E. Drake, Hockessin, Del., assignor to Hercules Powder Company, Wilmington, Del., a corporation of Delaware No Drawing. Application February 2, 1946, Serial No. 645,248

7 Claims. (Cl. 260—27)

This invention relates to an improved process for the emulsion polymerization of unsaturated compounds and more particularly to an improved process of polymerizing vinyl, vinylidene and vinylene compounds to provide improved synthetic rubberlike materials.

It is well known that unsaturated compounds such as those containing the vinyl group may be polymerized in aqueous emulsion. Synthetic rubberlike materials have been prepared using the emulsion technique by polymerizing diolefins, halogen derivatives of diolefins or other substituted diolefins, or by interpolymerizing diolefins with other compounds containing a vinyl group such as styrene, acrylic acid esters and acrylic acid nitrile. Polymers such as polyvinyl halides, polyvinyl acetate, polystyrene, polymethyl methacrylate and various other addition polymers also have been prepared by polymerization in aqueous emulsion.

Soaps of fatty acids are the most commonly used emulsifying agents for the above polymerizations but, although being effective emulsifying agents, they are not sufficiently water-soluble and are, therefore, quite difficult to remove from the polymerization products. The presence of fatty acids in rubberlike polymers has many disadvantages since, for example, they cause cloudiness in transparent plastic materials. Furthermore, the fatty acid soap remaining in the polymer is converted to free fatty acid when coagulants, such as salt and acid, are added as is commonly done in the precipitation of the polymer, and fatty acids decrease the tack of the rubber and should be removed from it to insure good physical properties in the rubber. The complete removal of fatty acids is difficult.

Now in accordance with this invention it has been found that vinyl, vinylidene and similar unsaturated compounds capable of undergoing polymerization in aqueous emulsion may be polymerized by a process comprising intimately contacting an aqueous solution containing an alkali metal dehydrogenated rosin salt and a water-soluble persulfate with an oxygen-containing gas, admixing the vinyl, vinylidene or similar unsaturated compound with the aqueous solution which has been treated with the oxygen-containing gas, and polymerizing the resulting emulsion.

The alkali metal salts of dehydrogenated rosin are excellent emulsifying agents in the preparation of polymers by emulsion polymerization. They also are advantageous in making it unnecessary to wash the emulsifying agents from rubbery polymers, since the presence of dehydrogenated rosin has been found materially to increase the tack in these polymers, such as the copolymer of butadiene and styrene, and the physical properties after cure also are improved. The use of these emulsifying agents, however, has been disadvantageous in that there existed initially a rather long period of limited reaction. In other words, before appreciable polymerization took place a considerable length of time elapsed during which the components of the polymerization emulsion attained a level of reactivity at which substantial polymerization began. It therefore has been necessary when using alkali metal dehydrogenated rosin salts as emulsifying agents to increase the total reaction period to obtain polymer yields which were comparable to those obtained when fatty acid soaps were used as the emulsifying agents. The process of this invention obviates the more lengthy reaction period previously required, since the initial limited reaction period is materially decreased.

In carrying out the process in accordance with this invention an alkali metal dehydrogenated rosin salt is dissolved in sufficient water to form an emulsifying solution. To this solution then is added a water-soluble persulfate, such as potassium persulfate. The resulting solution containing both the alkali metal salt of dehydrogenated rosin and the water-soluble persulfate then is heated and brought into intimate contact, as by blowing, with an oxygen-containing gas such as air. Following treatment of the solution with the oxygen-containing gas it is utilized in the usual manner as the emulsifying solution for the polymerization of vinyl and related compounds.

The following examples are illustrative of the preparation of polymers by emulsion polymerization in accordance with this invention. All parts given in the examples represent parts by weight.

EXAMPLE I

To 76.8 parts of the mixture (solids content, 65.2%; acid number 13.6) obtained by partial neutralization of a dehydrogenated rosin (dehydroabietic acid, 53%; abietic acid, 0.0%; retene, 0.2%) with concentrated aqueous sodium hydroxide were added approximately 300 parts of water and sufficient 0.5432 N aqueous sodium hydroxide to furnish 0.75 part of sodium hydroxide. Heating and stirring then were effected until complete solubilization occurred. The resulting solution was cooled and 3 parts of potassium persulfate dissolved in approximately 100 parts of water was added, after which sufficient water was added to bring the total weight to 833.3 parts. The resulting solution constituted a 6% solution of the sodium salt of the dehydrogenated rosin and contained 6% potassium persulfate based on the rosin salt. About 200 parts of the solution was set aside to represent an emulsifying solution which had not been intimately contacted with an oxygen-containing gas. The remainder of the solution was placed in a reaction vessel equipped with a reflux condenser and a high speed stirrer. The vessel and its contents were heated to a temperature of 65° C. and air permitted to come in contact with the highly agitated solution for a period of 2.5 hours. Samples of the solution were withdrawn at intervals for use in the emulsion copolymerization of butadiene and styrene.

The polymerizations were carried out by introducing 44.33 parts of the emulsifying solution into a polymerization vessel with 47.3 parts of distilled water and 1.00 part of an activating salt solution. The 1.00 part of activating salt solution contained 0.00525 part of 78% ferric sulfate nonahydrate, 0.075 part of sodium pyrophosphate decahydrate and 0.00019 part of cobaltous chloride hexahydrate dissolved in about 0.92 part of distilled water. To the emulsifying solution so diluted then were added 12.5 parts of styrene, 37.5 parts of butadiene and 0.25 part of the mixture of mercaptans derived from Lorol, which is a commercial product containing primarily lauryl alcohol but also some higher and lower aliphatic alcohols. The mixture was agitated at 50° C. for 14 hours in a sealed container. The emulsion was then run into an open vessel containing 5 parts of a 2% solution of phenyl β-naphthylamine, stripped of the excess butadiene and the polymer precipitated by the addition of an excess of a saturated salt solution. The precipitated polymer was washed with water until alkali free, then with alcohol and finally was dried to constant weight on a mill. The results are tabulated in Table 1.

Table 1

| Emulsifying Solution Sample No. | Length of Air Treatment (Hours) | Polymer Yield (Per cent) |
|---|---|---|
| 1 | 0 | 69.2, 69.6 |
| 2 | 0.75 | 73.4 |
| 3 | 1.5 | 74.4, 75.6 |
| 4 | 2.5 | 76.0, 76.4 |

EXAMPLE II

Following generally the procedure outlined in Example I an emulsifying solution was prepared from 78.2 parts of the mixture obtained by partial neutralization of a dehydrogenated rosin (dehydroabietic acid, 56%; abietic acid, 0.0%; retene, 0.5%) with concentrated aqueous sodium hydroxide. The resulting 6% solution of the sodium salt of the dehydrogenated rosin, and containing 6% potassium persulfate based on the rosin salt, was contacted with air for 3 hours at 65° C. A sample was withdrawn at the end of two hours. The emulsifying solutions were then utilized in the emulsion copolymerization of butadiene and styrene, including ferric sulfate, sodium pyrophosphate and cobaltous chloride as activating salts in all runs according to the technique of Example I. The results are tabulated in the following table:

Table 2

| Emulsifying Solution Sample No. | Length of Air Treatment (Hours) | Polymer Yield (Per cent) |
|---|---|---|
| 1 | 0 | 64.4, 66.2 |
| 2 | 2 | 80.2, 81.4 |
| 3 | 3 | 80.2, 80.4 |

EXAMPLE III

Essentially the same procedure as that found in Example I was utilized with the exception that the oxidation was carried out in an open vessel and the activating salts were added to the emulsifying solution prior to its treatment with air. The emulsifying solution contained 0.00525 part of 78% ferric sulfate nonahydrate, 0.075 part sodium pyrophosphate decahydrate and 0.00019 part cobaltous chloride hexahydrate for each 2.5 parts of the solid sodium salt of dehydrogenated rosin. The emulsifying solution was maintained at 65° C. during the air treatment and samples were taken at various time intervals. No additional activating salts were added during the actual polymerizations. The pH of each sample of emulsifying solution was adjusted to approximately 10.3 with aqueous sodium hydroxide before use of the solution. The data are recorded in the following table:

Table 3

| Emulsifying Solution Sample No. | Length of Air Treatment (Hours) | Polymer Yield (Per cent) |
|---|---|---|
| 1 | 0 | 62.8, 63.6 |
| 2 | 1 | 70.4, 69.8 |
| 3 | 2 | 74.4, 74.4 |
| 4 | 4 | 76.2, 76.0 |
| 5 | 6 | 76.0, 74.2 |
| 6 | 7.75 | 76.0, 76.2 |

EXAMPLE IV

To show the necessity of using an oxygen-containing gas during treatment of the emulsifying solution the procedure of Example I was modified to utilize nitrogen as exemplary of a nonoxygen-containing gas brought into intimate contact with the emulsifying solution. The emulsifying agent of Example II was used. Equal portions of the same emulsifying solution were placed in individual reactors, one of which contained a blanketing atmosphere of air and the other an atmosphere of nitrogen. Both reactors were sealed and agitated at 50° C. for 8 hours. Samples of the two emulsifying solutions were withdrawn at various identical time intervals and evaluated in the emulsion copolymerization of butadiene and styrene. The data of Table 4 illustrate that an oxygen-containing gas is a necessary ingredient in the treatment of the emulsifying solution.

Table 4

| Emulsifying Solution Sample No. | Length of Treatment (Hours) | Polymer Yield (Per Cent) | |
|---|---|---|---|
| | | Air Atmosphere | Nitrogen Atmosphere |
| 1 | 0 | 67.0, 68.6 | --------- |
| 2 | 3 | 72.4, 72.2 | --------- |
| 3 | 3 | --------- | 68.6, 69.6 |
| 4 | 6 | 77.4, 77.6 | --------- |
| 5 | 6 | --------- | 70.0, 70.0 |
| 6 | 8 | 80.6, 81.4 | --------- |
| 7 | 8 | --------- | 68.2, 68.2 |

The examples have set forth the use of air as the oxygen-containing gas, but the oxygen may be furnished in the form of pure or commercial oxygen or in mixtures of oxygen with nitrogen or other inert gases. It is desirable that oxygen be the only active oxygen component in the gas. The air may be of increasing or decreasing oxygen content in case it is desirable to fortify the air with added oxygen or to recycle air which previously has been used in the process. The air may be used either as it is readily available or as humidified up to the saturation point.

The dehydrogenated rosin soaps described in accordance with this invention are prepared by neutralization of dehydrogenated rosin with an alkali metal compound basic in nature. Alkali compounds suitable for this process are the carbonates, hydroxides, etc., of sodium, potassium, etc. The concentration of the soap in the emulsifying solution may vary between about 3% and about 60% but it is preferable that the concentration be between about 3% and about 10%, and a particularly applicable concentration is about 6%.

Dehydrogenated rosin may be prepared by the dehydrogenation or disproportionation of natural rosin or a rosin material containing a substantial amount of a natural rosin. The rosins which may be dehydrogenated or disproportionated may be gum or wood rosin. If desired, the rosin may be isomerized by treatment with an acidic isomerizing agent prior to dehydrogenation or disproportionation.

The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite and the like are suitable. The catalysts may be supported on a carrier such as grannular alumina, fibrous asbestos or activated charcoal. Dehydrogenation or disproportionation with a palladium catalyst, for example, may be conducted either by a batchwise or a continuous procedure. Thus the rosin may be agitated with about 5% to about 20% by weight of a palladium catalyst supported on activated carbon (1% to 2% palladium) at about 150° C. to about 300° C. for about 1 to about 5 hours. In the continuous process the molten rosin flows over the supported palladium catalyst at a temperature within the range of about 225 C. to about 300° C. to provide a contact time of about ¼ hour to about 1 hour.

It often is advantageous to refine the whole rosin prior to its dehydrogenation or disproportionation and the same is true as applied to the whole dehydrogenated or disproportionated product. Prior to its dehydrogenation or disproportionation, the rosin may be refined by crystallization, by means of a selective solvent, such as furfural or phenol, or by an absorbent earth such as fuller's earth. The dehydrogenated or disproportionated rosin product also may be refined as by distillation, heat-treatment, alkali extraction, precipitation, etc. It is desirable that the dehydrogenated or disproportionated rosin or derivative thereof contains at least 45% and preferably at least 50% dehydroabietic acid. The dehydrogenated or disproportionated rosin also should contain less than 2% abietic acid.

Although the use of potassium persulfate has been shown in conjunction with an alkali metal salt of dehydrogenated rosin in the emulsifying solution during treatment with an oxygen-containing gas, other water-soluble persulfates are operable. Sodium persulfate, ammonium persulfate, etc., are exemplary. The concentration of the water-soluble persulfate may be varied from about 0.05% to about 9% based on the amount of solid alkali metal salt of dehydrogenated rosin present. The preferable amount of persulfate on this basis, however, is about 6%. The treatment with the oxygen-containing gas as favored by dilute solutions of the alkali metal salt of dehydrogenated rosin and by high concentrations of the water-soluble persulfate, as well as availability of oxygen to the reaction mixture. Since the reaction is favored by high persulfate concentrations, the preferable amount is that usually employed in the polymerization reaction itself. There is no advantage in adding more persulfate to the emulsifying solution after the oxidation.

During treatment of the emulsifying solution with the oxygen-containing gas the temperature may be between about 25° C. and about 95° C., but a preferable range is from about 40° C. to about 70° C. A particularly applicable range, as shown by the examples, is from about 50° C. to about 65° C. The length of time involved in the treatment may vary from about 0.5 to about 25 hours, but a preferable time lies between about 2 and about 8 hours. Particularly useful is a reaction time of about 2 to about 4 hours at a temperature between about 50° C. and about 65° C.

Since the reaction between the emulsifying solution and the oxygen-containing gas constitutes a two-phase system, suitable agitation is necessary. It is particularly important to bring the air or other oxygen-containing gas into intimate contact with the emulsifying solution. This may be effected either by whipping the air or other oxygen-containing gas into the emulsifying solution by means of a high speed stirrer or by blowing the gas through the solution utilizing suitable nozzles, porous plates or their combinations.

As shown by the examples various activating salts may be added to the emulsifying solution either during its treatment with the oxygen-containing gas, or afterwards but prior to use of the solution in the actual polymerization. Activating salts such as those shown in the examples have been used in the emulsion polymerization of vinyl compounds with fatty acid soap emulsifying agents and have effected definite decreases in reaction times. In the case of dehydrogenated rosin soaps, however, these activating salts have no appreciable effect unless the emulsifying solution containing the dehydrogenated rosin soap has been intimately contacted with an oxygen-containing gas in the presence of a water-soluble persulfate. The beneficial effects of the oxidation process are emphasized most when an activating salt is used in the polymerization. The activating salts shown by the examples; namely, ferric sulfate, sodium pyrophosphate and cobaltous chloride, constitute what is known as a redox system. Redox systems are so called because of their property of catalyzing oxidation-reduction reactions and usually comprise a salt of a heavy metal such as iron, cobalt, or nickel associated with a complex-forming compound such as a pyrophosphate. The redox system, therefore, comprises essentially a heavy metal complex wherein the metal is united to another element by coordinate covalences rather than by primary valences. Amounts between about 0.1% and about 1% by weight of the heavy metal complexes based on the monomers present are generally suitable. The salts of some heavy metals, such as iron, are sufficiently active so that the salt of only one metal need be present, but usually the redox system contains at least two heavy metal salts, and each individual salt my be present in the redox system in amounts between about 0.0003% and about 0.01% by weight based on the monomers employed.

As shown in Example III the pH of the emulsifying solution may be adjusted to a constant value following contact of the solution with an oxygen-containing gas. The data of the example demonstrate that this procedure effects a constant polymer yield, particularly with those emulsifying solutions which have undergone sufficient oxidation to give a satisfactory yield of polymer. The pH adjustment insures the presence of a neutral alkali metal dehydrogenated rosin salt in the emulsifying solution and results in maintenance of the activity of the latter over considerable lengths of time. The hydroxides of sodium, potassium and the like are suitable, either as the solid materials themselves or in the form of their aqueous solutions, for the pH adjustment.

Compounds which may be advantageously polymerized in aqueous emulsion by means of an emulsifying solution containing an alkali metal dehydrogenated rosin salt and which has been intimately contacted with an oxygen-containing gas in accordance with this invention include the conjugated butadiene hydrocarbons, butadiene and its derivatives such as isoprene, dimethyl butadiene, chloroprene, etc., and other compounds containing the vinyl group such as styrene, acrylonitrile, etc. The emulsifying solution treated according to this invention has been found to be an excellent emulsifying agent particularly in the preparation of the copolymers of butadiene and styrene or acrylonitrile, isoprene and styrene or acrylonitrile, and other rubberlike polymers as well as in the preparation of polymers such as polyvinyl chloride, polyvinyl acetate, polystyrene, polymethyl methacrylate, polyvinylidene chloride and the various other addition polymers which may be prepared by the emulsion technique.

The polymerizations may be subjected to the same variations in reaction conditions, e. g., concentration of the reactants, temperature, pressure, etc., as those in which a fatty acid soap is used. The temperature of the reaction may vary from about 20° C. to about 100° C., preferably from about 40° C. to about 60° C.

By the process of this invention it is possible to obtain high yields of polymers using alkali metal salts of dehydrogenated rosin as emulsifying agents without extending the total polymerization reaction time unduly. This is due to the fact that the initial period of limited reaction is shortened. The yields of butadiene-styrene copolymers obtained following the process of this invention are in the range of about 78% to about 82% in 14 hours at 50° C., and compare favorably with the yields obtained under similar conditions using fatty acid soaps as emulsifying agents. The emulsifying solution of this invention effects polymerization at a temperature of 50° C. of butadiene in about 90% yield in 12–14 hours, of butadiene-acrylonitrile in about 80% yield in 14 hours, of styrene-isoprene in about 100% yield in 12 hours, of styrene in about 80% yield in 16 hours, and of methyl methacrylate in about 100% yield in 16 hours.

Another advantage obtained by contacting an emulsifying solution containing an alkali metal dehydrogenated rosin salt and a water-soluble persulfate with an oxygen-containing gas is that the modifier, for example, lauryl mercaptan, utilized during polymerization is not consumed in as large amounts as is the case otherwise. When no oxygen treatment is applied, a large proportion of the modifier is consumed during the initial slow reaction period when very little polymerization is occurring. By the process of this invention a yield of polymer is obtained in the same length of time as is the case when fatty acid soaps are used as emulsifying agents. It is advantageous to use the alkali metal salts of dehydrogenated rosin as emulsifying agents rather than fatty acid soaps in the polymerization of vinyl and related compounds, and, since the present process eliminates the period of initial limited reaction previously incurred with dehydrogenated rosin soaps, use of the latter is even more advantageous. The rubberlike polymers formed by the emulsion polymerization of butadiene and styrene, for example, in the presence of dehydrogenated rosin soaps and containing as a result of the precipitation procedure up to about 5% of dehydrogenated rosin exhibit high tensile strengths and elongations when compounded and vulcanized. The tack, building properties and mill behavior in the unvulcanized state are also noticeably improved. Polymers prepared using dehydrogenated rosin soaps apparently have a different and superior polymeric structure as compared to those formed with fatty acid soaps.

What I claim and desire to protect by Letters Patent is:

1. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with a free oxygen-containing gas for at least 0.5 hour and then polymerizing said organic compound in aqueous emulsion in the presence of the resulting aqueous solution, said aqueous solution functioning both as an emulsifying agent and as a catalyst for the polymerization.

2. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with a free oxygen-containing gas for at least 0.5 hour and then polymerizing said organic compound in aqueous emulsion in the presence of the resulting aqueous solution and also in the presence of water-soluble salts of two heavy metals selected from the group consisting of iron, cobalt and nickel, and a water-soluble pyrophosphate, said resulting aqueous solution functioning both as an emulsifying agent and as a catalyst for the polymerization.

3. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with a free oxygen-containing gas for at least 0.5 hour and then polymerizing said organic compound in aqueous emulsion in the presence of the resulting aqueous solution and also in the presence of water-soluble salts of iron and cobalt, and a water-soluble pyrophosphate, said resulting aqueous solution functioning both as an emulsifying agent and as a catalyst for the polymerization.

4. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with a free oxygen-containing gas for at least 0.5 hour and then polymerizing said organic compound in the presence of the resulting aqueous solution and also in the presence of water-soluble salts of ferric sulfate and cobaltous chloride, and sodium pyrophosphate, said resulting aqueous solution functioning both as an emulsifying agent and as a catalyst for the polymerization.

5. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with a free oxygen-containing gas for at least 0.5 hour at a temperature of from about 25° C. to about 95° C. and then polymerizing said organic compound in aqueous emulsion in the presence of the resulting aqueous solution, said resulting aqueous solution functioning both as an emulsifying agent and as a catalyst for the polymerization.

6. A process for polymerizing an organic compound containing the $CH_2=C<$ group which is polymerizable by a peroxide catalyst which comprises intimately contacting an aqueous solution containing an alkali metal salt of dehydrogenated rosin and a water-soluble persulfate with air for at least 0.5 hour and then polymerizing said organic compound in aqueous emulsion in the presence of the resulting aqueous solution, said resulting aqueous solution functioning both as an emulsifying agent and as a catalyst for the polymerization.

7. A process for polymerizing butadiene-1,3 and styrene which is polymerizable by a peroxide catalyst which comprises intimately contacting an aqueous solution containing an alkali metal salt of dehydrogenated rosin and a water-soluble persulfate with a free oxygen-containing gas for at least 0.5 hour and then polymerizing said organic compound in aqueous emulsion in the presence of the resulting aqueous solution, said resulting aqueous solution functioning both as an emulsifying agent and as a catalyst for the polymerization.

ARTHUR E. DRAKE.

REFERENCES CITED

The following references are of record in the file of this patent:

UNITED STATES PATENTS

| Number | Name | Date |
|---|---|---|
| 1,935,733 | Tschunker | Nov. 21, 1933 |
| 2,380,617 | Stewart | July 31, 1945 |
| 2,388,477 | Fryling | Nov. 6, 1945 |
| 2,391,233 | Gruber | Dec. 18, 1945 |
| 2,397,201 | Pfau | Mar. 26, 1946 |
| 2,434,643 | Drake | Jan. 20, 1948 |